A. A. ROTH.
SANDER FOR AUTOMOBILES.
APPLICATION FILED NOV. 26, 1917.

1,366,594.

Patented Jan. 25, 1921.
2 SHEETS—SHEET 1.

Witness
Edwin L. Bradford

Inventor
August A. Roth
By Mann & Co.
Attorneys

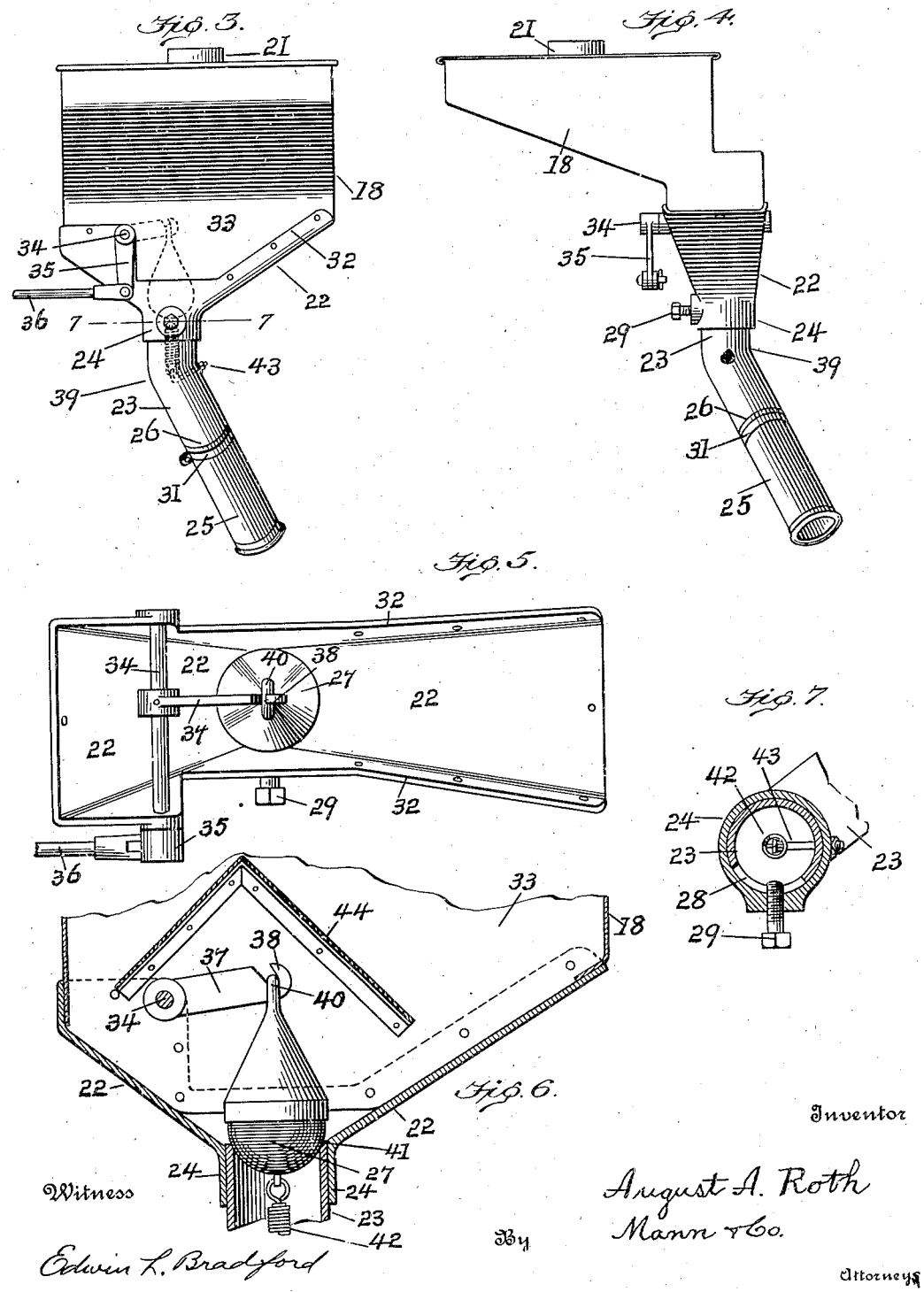

UNITED STATES PATENT OFFICE.

AUGUST A. ROTH, OF BALTIMORE, MARYLAND.

SANDER FOR AUTOMOBILES.

1,366,594. Specification of Letters Patent. Patented Jan. 25, 1921.

Application filed November 26, 1917. Serial No. 203,870.

*To all whom it may concern:*

Be it known that I, AUGUST A. ROTH, a citizen of the United States, residing at Baltimore, in the State of Maryland, have invented certain new and useful Improvements in Sanders for Automobiles, of which the following is a specification.

This invention relates to certain improvements in road-sanding devices for use on self-propelled vehicles, whereby to apply sand when the road surface is wet and slippery, and to deposit the sand on the road surface at a point adjacent the inner side of that part of the tire of the two driving wheels that are in contact with the road surface.

The present invention consists of improvements on the devices shown and described in the United States Letters Patent of August A. Roth and Bartlett B. James, sander for automobiles, assignors to Surface Grip Corporation, dated Oct. 16, 1917, No. 1,243,632.

It will be understood that according to the patent referred to the sand is to be applied to prevent skidding at the moment the emergency requires, and the method of applying sand to the road surface is to drop the sand adjacent the inner side of the driving-wheel tire which insures that when the wheels are slipping sidewise the sand will be positioned on the road surface at the spot where it will be most effective in producing friction.

The invention is illustrated in the accompanying drawing in which,—

Fig. 3, is a side view of one sand-magazine and its inclined sand discharge pipe.

Fig. 4 is another side view of the same parts shown in Fig. 3.

Fig. 5, is a top view of the sand-magazine while the cover and side walls of the magazine are removed, and shows the inside of the bottom of the sand-magazine and the top of the sand-discharge-valve.

Fig. 6, shows a vertical section of the hopper-bottom of the sand-magazine, the sand-discharge pipe, the valve-guard, and a side view of the valve in its closed position below the valve-guard.

Fig. 7, is a horizontal sectional view of the sand-discharge pipe on the line 7—7 of Fig. 3.

Figure 1:
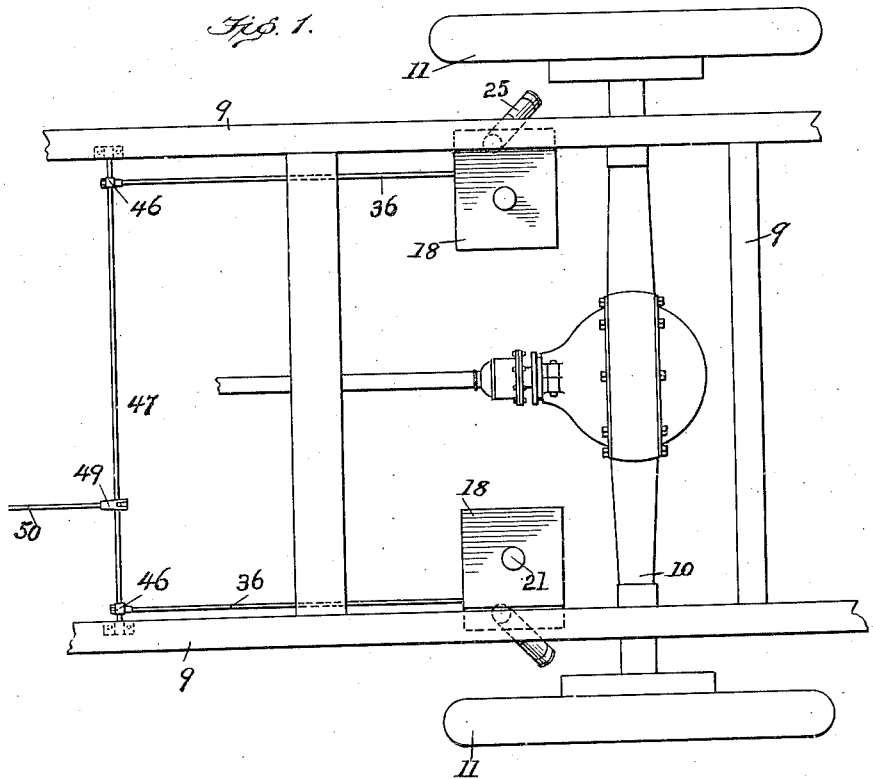
Figure 1, is a plan view of the rear part of the chassis, the axle and the driving wheels, and showing the two sand-discharging spouts and their position relative to both rear wheels.

Referring now to the drawings for a description of the parts, the numeral, 9, designates the chassis frame of an automobile or motor car, 10 the rear axle, and 11 the tire of a driving wheel.

The sander apparatus has two sand-magazines, 18, that are to contain the sand or other granular material that is to be applied to the surface of a road to prevent the wheels from slipping. One of the sand-magazines is mounted at the right-hand side of the chassis looking in the forward direction, and the other magazine at the left-hand side, each magazine being positioned near one of the driving wheel tires and carries the sand supply for that one particular wheel.

The shape of a sand-magazine adapted for this purpose of course may vary according to the ideas of the constructor. In the present instance the magazine has a flat top in which is an inlet that admits a supply of sand to the interior; this inlet is closed by a suitable cover, cap or door, 21.

The magazine has a hopper-shaped bottom, 22, at the lowest point of which is a tubular connection, 24, into which fits the upper end of a sand-discharge pipe, 23.

This discharge pipe is formed of two endwise sections, or lengths, which are approximately of equal measurement. The upper section, 23, should be composed of metal, and may be iron or brass, and as the lower or nozzle section, 25, is resilient or yielding in order to prevent being broken by a stone fixed in the roadway, it should be made of rubber or leather.

The ends of the two sections are connected together at 26, in any preferred manner; no claim is made to any special means of effecting this connection. One way of connecting the two sections is to insert the lower end of the metal section, 23, into the upper end of the rubber section, 25, and then said lapped ends are fastened by a metal band, 31, around the rubber end as in Fig. 3.

As already stated the upper end of the sand-discharge pipe, 23, fits into the tubular part, 24, on the bottom of the sand-magazine, 18; this upper end of said pipe has a crosswise slot, 28, see Fig. 7, cut into one side of the pipe, and said tubular connection 24, has a set-screw, 29, entered from the outside through said connection and the point-end of the set-screw extends through said slot, 28, and thereby prevents the sand-pipe, 23, from detaching; this slot and set-screw construction also allows the sand-pipe to be turned slightly in the part, 24; the upper section, 23, of the sand-pipe is provided with an angle bend, 39, which makes it advantageous in turning the pipe to adjust the position of the lower discharge nozzle end and cause the latter to swing more or less closely relative to the inner side of the driving-wheel tire, 11, where said tire contacts with the road surface.

The interior structure of the sand-magazine is shown in Figs. 5 and 6. The hopper-bottom, 22, inclines from two opposite ends downwardly to the tubular part, 24, where the valve-port and valve are located; the bottom has on several of its edges an up-turned flange 32, which takes on the outer side of several of the walls, 33, of the magazine. Within the sand-magazine is a horizontal rock-shaft, 34, whose ends are in bearings formed in the opposite up-turned flanges, 32; at least one end of the rock-shaft protrudes through to the outer side where an arm, 35, is attached, and a rod, 36, is jointed to said arm and leads forward, and this rod enables the driver of the automobile to control the sand-discharging valve, 27, as will presently be explained.

An arm, 37, is rigidly secured on the rock-shaft, 34, and the rocking of said shaft causes an up- and down-swinging movement to the arm, 37; at its free end the arm is provided with a hook, 38, that engages an eye or loop, 40, on the top end of the valve 27.

This loose means of connecting the valve to the hook of the arm 37, affords some freedom of lateral movement to the valve, when opening and closing, that is desirable where the material to be controlled is sand.

In the present instance the valve-device see Fig. 6, has a side-view shape similar to a child's spinning top when turned upside down. The rounded bottom part, 27, of the valve is preferably made of flexible rubber which insures a close-fitting seat on the upper end, 41, of the sand-discharge pipe, 23. At its lower end the valve has suitable means by which a spiral spring, 42, can be connected. In the present instance the upper end of a spiral spring 42, is secured to the valve and said spring extends downward through the port into the sand-pipe 23, and the lower end of the spiral spring is made fast to a screw or bolt 43, that extends crosswise of said sand-pipe, see Figs. 3, 6, and 7. When the rock-shaft arm, 37, raises the valve, 27, the spring, 42, yields to allow the valve to raise from its seat and permit sand to run out through the pipe, 23, to the road surface. When the rock-shaft arm 37, swings downward to close the valve, the said spring, 42, will draw downward on the loosely-hung valve and assist it to seat properly.

The interior of the sand-magazine, 18, is provided with a top-guard, 44, positioned over the said valve, 27, and serves to prevent the bulk of the sand from sliding down said inclined bottom, and thus crowding upon the valve, or when replenishing the magazine at the top opening with a fresh supply of sand, said guard will prevent a too great portion of the weight of the sand from piling up on top of the valve. The sand-guard 44, has two slanting sides which join together and form a high center ridge, and in appearance seen in Fig. 6, resembles a gable-roof. This guard is placed in the magazine over the outlet valve, the high center being upward, and the guard secured with the lower edge of the slanting side adjacent but not touching the inclined hopper-bottom. The highest point under the center ridge of the guard, 44, affords space for the rock-shaft arm, 37, and the top loop, 40, of the said valve to rise when the valve opens.

Figure 2:
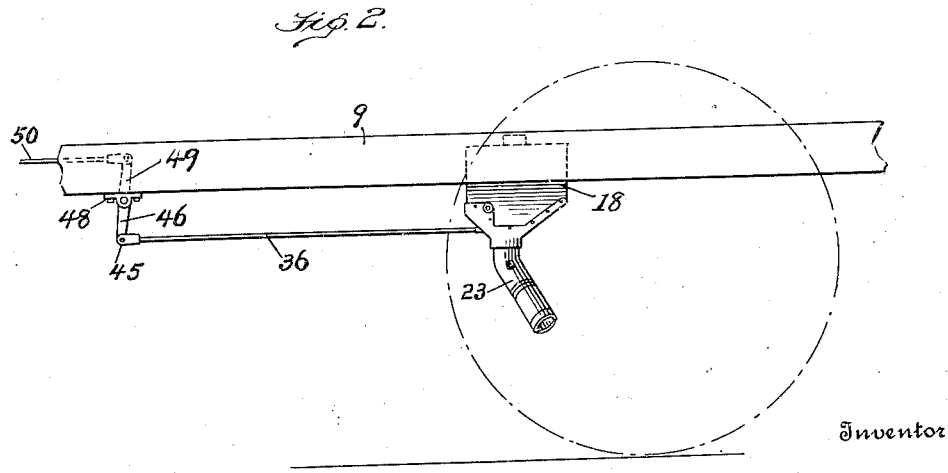
Fig. 2, is a side elevation of the parts seen in Fig. 1, one rear wheel being indicated in a broken circular line.

By reference to Figs. 1 and 2 it will be seen the valve-operating rod, 36, from one sander extends forward along one side of the chassis, and the same rod from the other sander likewise extends along the other side of the chassis, and that the forward end of each rod is jointed at, 45, to a short downward-projecting arm, 46, and that the two arms, 46, are both on a rock-shaft 47, which partly turns in bearings, 48, fixed on the chassis frame, 9. This rock-shaft, 47, has an upward-projecting arm, 49, which is fixed thereon intermediate of the two bearings 48, and a rod, 50, connected to the said upward-projecting arm 49, extends forward to a position (not shown) where it may be moved manually, by the hand of the person driving the automobile, to apply sand to the road surface adjacent both driving wheels.

I have shown and described a sand-discharge pipe for each driving wheel of an automobile car, a magazine for the car to contain a storage of sand, means operable by the car-driver whereby all the sand-discharge pipes may deliver sand to the driver wheels at the same time, and all these parts arranged so that each discharge pipe will receive its due supply of sand. It is immaterial whether there be one sand-magazine for the two sand-discharge pipes, or a magazine for each pipe.

Having described my invention I claim,—

1. In a road-sander for automobile cars, the combination of a sand-magazine, having a hopper-bottom whose lower termination ends with a tubular connection; a sand-discharge pipe provided near its upper end with a crosswise slot opening only at one side, and the upper extremity of said pipe entered into said tubular connection; a set-screw entered at the outer side of said tubular connection and the point-end of the screw engaging the crosswise slot in the sand-discharge pipe.

2. In a road-sander for automobile cars, the combination of a sand-magazine provided with an outlet valve-port; a valve within the magazine having a rounded bottom of flexible material which seats on and partly fills said port said valve having a cone-shaped top whose point end is uppermost; and means to raise said valve from its seat.

3. In a road-sander for motor cars, the combination of a sand-magazine having a tubular part projecting exteriorly; a sand-discharge pipe whose upper end connects with and partly turns in said tubular part and said pipe immediately below its connection having an angle-bend whereby when the pipe partly turns the lower discharge-end of the pipe will swing more or less closely relative to the driving wheel tire; and means to limit the extent of said turning movement.

4. In a road sander for automobiles the combination with a magazine having reversely inclined bottom walls which slope toward each other, of an outlet tube at the junction of said inclined bottom walls and having its end open; a plurality of inclined plates in the magazine above the open tube-end; a valve in the magazine under the inclined plates and having its lower end seated on the open end of the tube; means under the inclined plates for lifting the valve and means below the valve for yieldingly holding the latter down on the tube end.

5. In a road sander for automobiles, the combination with a sand magazine having an inclined bottom, of a tube opening into the said inclined bottom and depending therefrom; a guard device in the magazine and having reversely inclined plates; a rock-shaft entering the magazine between the guard device and the inclined bottom; an arm projecting from the rock-shaft beneath the guard device; a valve having a rounded seating surface to seat over the entrance to the tube said valve having a conical upper end which is attached to the rock-shaft arm under the guard device, and a spring extending upwardly from the interior of the said tube and connected to the rounded side of the said valve to pull the latter down to its seat.

In testimony whereof I affix my signature in the presence of two witnesses.

AUGUST A. ROTH.

Witnesses:
  E. K. Edwards,
  Charles B. Mann, Jr.